FIG I

Aug. 19, 1969  J. C. WHITE  3,461,760
TRIMMING APPARATUS
Filed Feb. 1, 1967
3 Sheets-Sheet 3

INVENTOR.
JAMES C. WHITE
BY Learman & McCulloch

> United States Patent Office 3,461,760
Patented Aug. 19, 1969

1

3,461,760
TRIMMING APPARATUS
James C. White, Gladwin, Mich., assignor to Brown
 Machine Company of Michigan, Inc., Beaverton, Mich.,
 a corporation of Michigan
Filed Feb. 1, 1967, Ser. No. 613,261
Int. Cl. B65h 35/00
U.S. Cl. 83—81            13 Claims

ABSTRACT OF THE DISCLOSURE

The invention is concerned with generally horizontally traveling pusher mechanism for stacks of nested plastic container parts which normally advances the parts through female severing dies and adds them to the rear end of each stack after they have been punched out of a vertically disposed plastic web by horizontally reciprocating male die members and is embodies in mechanism which at intervals moves the pusher mechanism ahead an increased distance to separate the stacks formed from those which will subsequently be formed.

---

This invention relates to trim machines and more particularly to trim machines for separating articles such as containers or container parts from webs or sheets of thermoplastic plastic material in which they have been formed by differential pressure thermoforming machines and delivering them in nested stacks to product delivery chutes.

BACKGROUND OF THE INVENTION

In prior art container making production lines trim presses have often delivered container parts to systems of the character disclosed in U.S. Patents Nos. 3,096,546 and 3,192,565 wherein pneumatic tubes have conveyed the parts to subsequent handling machinery. In such systems, control of the parts is not maintained in the sense that they proceed individually rather than in nested stacks containing a predetermined number of parts.

One of the prime objects of the present invention is to provide a system wherein the parts are stacked at the separating station and wherein nested stacks having a predetermined accumulation of parts can thereafter be separated by the trim press mechanism.

A further object of the invention is to design simple, practical, and reliable mechanism for attachment to conventional trim presses which accomplishes the aforementioned objects.

In the drawings, FIGURE 1 is a side elevational view of the trim press, with portions of the frame broken away to show the various component parts thereof, the trim die being shown in rearward position;

Figure 1:
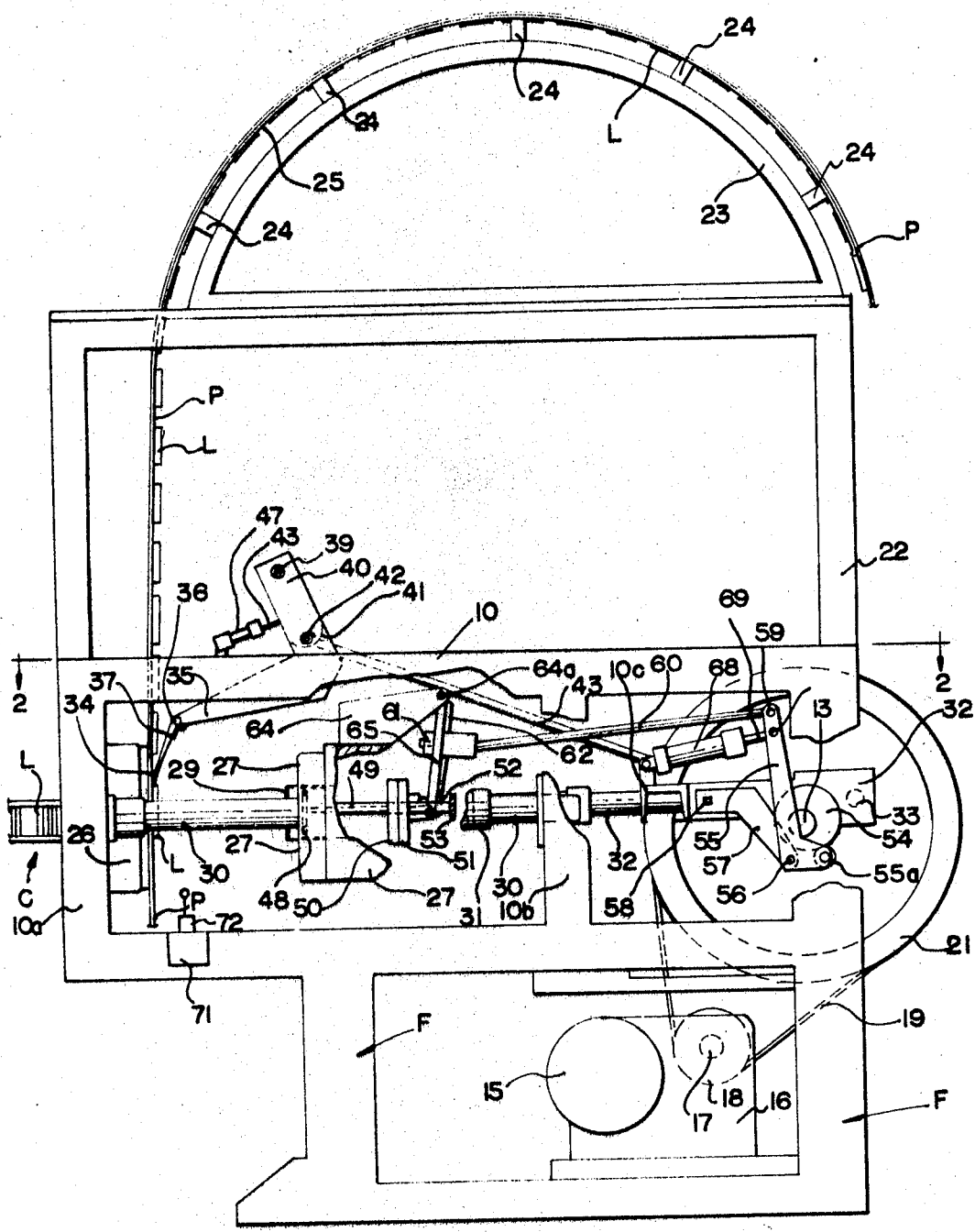

Referring now more particularly to the accompanying drawings, wherein a preferred embodiment of the invention only is shown, a letter F generally indicates the frame of the machine, which includes side frame members 10 connected at their front ends by a front frame member 11, and at their rear ends by a rear frame member 12. The machine is of the general character disclosed in Martin U.S. Patent No. 3,217,576 and similarly includes a drive shaft 13 supported from the frame F by bearings 14. The shaft 13 is driven by a motor 15 through a speed reducing gear box 16 having an output shaft 17 on which a drive pulley 18 is mounted. Trained around the drive pulley 18 are drive belts 19 which extend to a drive pulley 20 fixed to shaft 13. A flywheel 21 is also provided on the shaft 13 as usual.

Mounted above the side frame members 10 are upper side frame members 22 on which curvilinear, semicircular frame member 23 are fixed as shown in FIGURE 1. Supports 24 on the frames 23 support curvilinear rods 25 over which the plastic web or sheet P is trained and, as those in the art are well aware, in factory production lines the plastic sheet P extends from a differential pressure thermoforming machine (not shown) which thermoforms parts such as container lids L in the sheet P. The leading end of sheet P is brought downwardly between the side frames 22 and 10 between a stationary severing die 26 and a cooperable reciprocating severing die 27 which, in FIGURE 1, is shown in rearward position.

Provided in the die 26 are openings 28 which are of a size to pass the lids L and provided on the front face of the reciprocating die 27 are tubular punch-out members 29 which are axially aligned with the openings 28 in the die 26. As in the Martin patent previously mentioned, punch-out die edges 29a cooperate with the front edges 28a of the openings 28 in the stationary die 26 to sever the lids L from the plastic sheet P when the die 27 is moved forwardly to engage the plastic sheet P.

Figure 2:
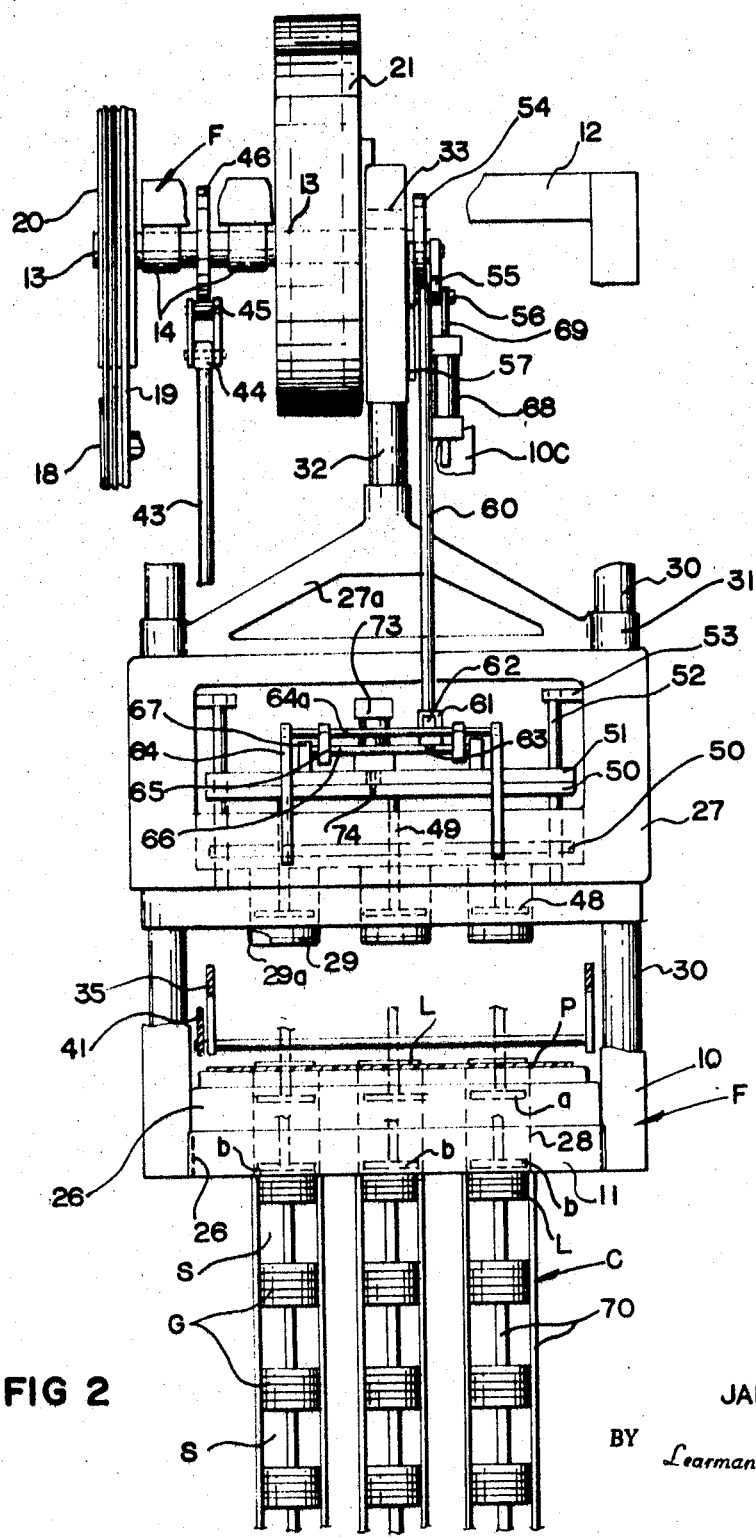
FIGURE 2 is a fragmentary, sectional top plan view thereof on a slightly enlarged scale, taken on the line 2—2 of FIGURE 1, and illustrating the manner in which the parts are separated into groups of predetermined number, the diagrammatic lines illustrating the normal forward position of the pusher members and the more advanced stack-separating position thereof.

Mounting the reciprocal die 27 for reciprocating movement are the support rods 30 which extend between the front portions 10a of side frame members 10 and intermediate vertical portions 10b thereof. As shown particularly in FIGURE 2, the die 27 includes a yoke portion 27a, including slide bearings 31 for receiving the guide rods 30, and connects to a pitman rod 32 which has an eccentric connection 33 to flywheel 21 in the manner of the machine illustrated in the aforementioned Martin U.S. patent. Plainly, as the flywheel 21 revolves, the pitman rod 32 is oscillated and die 27 is moved to and fro along the stationary guide rods 30. As in the patent mentioned, plastic web feed fingers 34 are provided to index the sheet P downwardly after each stroke of the reciprocating die 27. The fingers 34 are pivotally mounted on bell crank levers 35 as at 36, there being a spring such as leaf spring 37 which normally forces the fingers 34 against the sheet P.

The bell crank arms 35 are fixed to a shaft 39 supported in bearings 40 which is operated by a dependent arm 41 also fixed to shaft 39 and which can be connected, as at 42, to an operating rod 43 having a clevis 44 at its rear end mounting a cam follower roller 45 in engagement with a cam 46 on the shaft 13. An air cylinder 47 connected to frame F normally maintains the roller 45 in rear position against cam 46 and when a fall in the cam is encountered moves the rod 43 rearwardly to pivot bell crank arms 36 counterclockwisely and cause fingers 34 to push the sheet P downwardly. As in the aforementioned Martin patent, projections (not shown) may be provided on the plastic sheet P between the horiontal rows of lids L to be engaged by the fingers 34.

Provided to move the lids L forwardly after they have been punched out by the die members 29 are pusher members 48 mounted on rods 49 which connect to a front plate member 50. The plate 50 and a rear drive plate member 51 are slidably mounted on guide rods 52 supported by support blocks 53 on the die platen 27. A cam 54 mounted on the shaft 13 is provided to advance the plate 51 and thereby plate 50 and pushers 48 a sufficient distance with each stroke of the movable die 27 to move the pushers 48 forwardly to the position a in FIGURE 2. This movement normally advances a row of lids to the rear of stacks being formed and nests them with the preceding lids. A bell crank lever 55 is pivotally mounted as at 56 on a support 57 bolted to the rod 32 as at 58 and at is upper end the bell crank lever 55 is pivotally connected as at 59 to an operating rod 60 having a block 61 which is adjustably connected to a vertically extending rack bar 62. A set screw 63 is provided to hold the block 61 in vertically adjusted position relative to rack gear 62 and extends into one of the recesses therein between the teeth thereof. This manner of connecting the parts permits a choice of the desired length of stroke for plates 51 and 50. At its upper end the rack 62 is welded to a pivotal shaft 64a supported by brackets 64 from platen 27. The stroke of the rod 60 is transmitted from the shaft 64a to the plate 51 by dependent arms 65 fixed to shaft 64a which rigidly connect to a pivotal shaft 66 journaled by supports 67 on plate 51. The arm 55 is maintained in rearward position with follower roller 55a in engagement with cam 54 by an air cylinder 68 mounted on frame member 10c and having its piston rod 69 connected to arm 55 and normally urging it in a counterclockwise direction in FIGURE 1 about its pivot 56. When the fall of cam 54 permits, the cylinder 68 moves the arm 55 counterclockwisely in FIGURE 1 and pushes the rod 60 forwardly to move the plates 51 and 50 forwardly on the guide rods 52. The rods 49 are thereby moved forwardly and the pushers 48 move the lids L, which have been severed, forwardly in the stationary die openings 28.

Extending forwardly of each die opening 28 is a lid-receiving chute generally designated C which is comprised of generally circularly arranged, forwardly extending rods 70. It is desired to separate the lids L into groups, such as shown at G in FIGURE 2, spaced apart a distance S, and for this purpose a counter device 71 (FIGURE 1) is provided to count the strokes of the mechanism. The counter is a conventional electrically operated counter of the type manufactured by the Eagle Company of Davenport, Iowa, and may comprise its Model H240A6. It is operated by a limit switch 72 in the usual manner, which is actuated by the reciprocable die 27, and when a predetermined number of strokes has occurred is connected to operate a cylinder 73 which has its piston rod 74 extending through an opening 75 in the plate 51 to connect to the plate 50. While I have shown the switch 72 as operated by the movable die 27, it should be apparent that the switch could also be operated by the rod 43 or rod 60, or by a lug on flywheel 21. When the cylinder 73 is moved forwardly the plate 50 is moved forwardly relatively to plate 51 and the pushers 48 are moved ahead an increased distance to the position b shown in FIGURE 2. In the present instance, I have shown the pushers 48 as opperative to move to a position b after a group of five lids L has accumulated. However, it is clear that the pushers 48 could be moved to this advance position b after any number of strokes of the movable die 27. For example, it may be desirable to accumulate 50 or 100 lids L in a group G before moving the pushers 48 to the extreme position b to effect the spacing desired between stacks.

Figure 3:
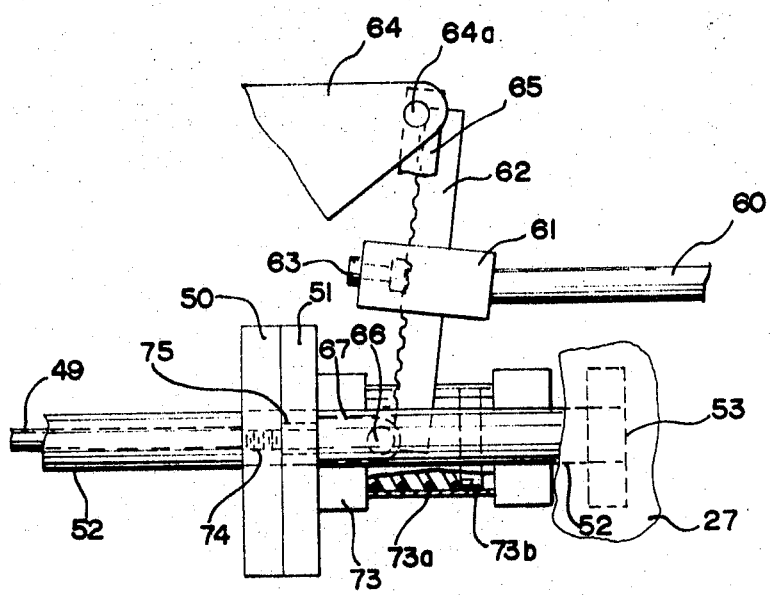
FIGURE 3 is an enlarged fragmentary view of the pusher operating mechanism.
Figure 4:
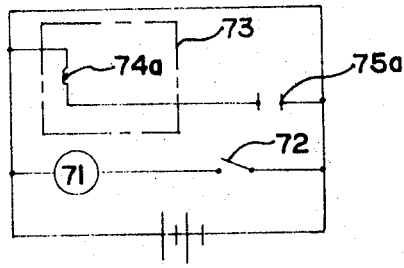
FIGURE 4 is a schematic view illustrating a typical electrical control circuit.

IN FIGURE 4 I have shown a typical electrical control circuit wherein the single-acting, spring returned air cylinder 73 is diagrammatically depicted as having an advance solenoid 74a connected in series with the normally open operating contacts 75a of the counter 71. As FIGURE 3 indicates, the piston 73b of the air cylinder 73 is returned by spring 73a and operates to maintain the plate 50 in engagement with the die plate 51 except when the solenoid 74a is energized and the plate 50 is advanced forwardly to move the pushers 48 to position b.

In operation the operating rod 43 first moves rearwardly to cause figures 34 to move the sheet P downwardly a distance sufficient to dispose a horiontal row of lids L in alignment with the openings 28 in the stationary die 26. At this time the pitman rod 32 moves the reciprocating die 27 forwardly so that punch-out members 29 cooperate with the edges of openings 28 to sever the lids L from the plastic sheet P. Just after this occurs, the operating rod 60 moves pushers 48 forwardly to the position a to move the lids L a lid width to the rear of a stack being formed in openings 28, and then returns. Also, the counter device 71 is actuated with the closing of limit switch 72 to record one stroke of the mechanism, indicating that one lid has been added to each stack.

The machine continues to operate in this manner, with the accumulating stacks being moved forwardly through openings 28 to the chutes C until a predetermined number of lids L have been added to each stack. The counter device 71 is preset so that after it is operated a predetermined number of times its contacts 75a are closed momentarily to energize the solenoid 74a of cylinder 73 and move the pushers 48 forwardly to the position b. In so doing, the pushers 48 advance the stacks sufficiently so that there will be a spaced distance between the stacks advanced and subsequent stacks to be formed. The separated stacks may then be mechanically or manually removed from chutes C in stacks of predetermined number to further processing machinery.

I claim:

1. Trim press apparatus for processing container parts comprising: tubular die means at a separating station for separating the parts from a generally vertically disposed plastic web in which they have been differential pressure thermoformed; elongate chute means extending forwardly from said die means in alignment therewith; pusher means for moving the separated container parts forwardly in the die means to stack them in nested relation therein and move them along said chute means; means for moving the pusher means in a normal to-and-fro stroke; and means for moving the pusher means in an increased to-and-fro stroke at periodic intervals to provide a space between the stack moved forwardly and a stack to be subsequently formed.

2. The combination defined in claim 1 in which said die means includes a series of laterally spaced die openings of a size to accommodate said parts and a movable die platen having tubular die members cooperating with said openings to sever parts from the web; and said pusher means comprises a pusher for each die member mounted for to-and-fro movement relative thereto.

3. The combination defined in claim 2 in which said pushers are carried on said movable die platen.

4. The combination defined in claim 2 in which said pushers are mounted on rods secured to a pusher rod platen.

5. The combination defined in claim 2 in which drive shaft means including motion translation means creating to-and-fro movement is provided for driving said movable die platen and connecting link means connects said movable die platen and motion translation means; said pusher means is mounted for to-and-fro movement with said movable die platen; and operating linkage means connects said drive shaft means and pusher means for moving said pushers forwardly of each die member at the end of the forward stroke of the movable die platen.

6. The combination defined in claim 5 in which said pushers connect to a pusher platen; and a drive plate for said pusher platen is rearward thereof and connects with said operating linkage means for moving said drive plate and thereby said pusher platen forwardly.

7. The combination defined in claim 6 in which said means for moving said pusher means in an increased to-and-fro stroke comprises pressure fluid actuated cylinder means connected to said pusher platen and moving it forwardly relative to said drive plate.

8. The combination defined in claim 6 in which said operating linkage means comprises to-and-fro motion creating means connected with said drive shaft means and forwardly extending operating rod means connected thereto; pivotally supported, oscillating link means connected with said drive plate for moving it to and fro; and means connecting said operating rod means with said oscillating link means at different positions to vary the length of stroke of said drive plate and thereby the normal stroke of said pusher platen.

9. The combination defined in claim 8 in which said latter means includes a vertically inclined bar with a vertically arranged series of recesses therein.

10. Trim press apparatus for processing container parts comprising: tubular die means at a separating station for separating the parts from a generally vertically disposed plastic web in which they have been differential pressure thermoformed; elongate chute means extending forwardly from said die means in alignment therewith; pusher means for moving the separated container parts forwardly of the die means a first and a second predetermined distance at first and second predetermined intervals.

11. Apparatus as in claim 10 further including means for selectively varying said first predetermined distance.

12. Trim press apparatus for processing container parts comprising: tubular die means at a separating station for separating the parts from a generally vertically disposed plastic web in which they have been differential pressure thermoformed; elongate chute means extending forwardly from said die means in alignment therewith; and pusher means for selectively moving the separated container parts forwardly in the die means to stack them in nested relation therein and move them along said chute means, and for moving the stack formed forwardly from the separating station at intervals after a predetermined accumulation to provide a space between the stack moved forwardly and a stack to be subsequently accumulated.

13. Trim press apparatus as set forth in claim 10 wherein said pusher means are carried by cooperating die means on a reciprocable platen.

References Cited
UNITED STATES PATENTS

| | | | |
|---|---|---|---|
| 1,271,844 | 7/1918 | Bruckman | 83—90 |
| 1,669,164 | 5/1928 | Holman | 83—97 |
| 3,335,927 | 8/1967 | Zwiebel | 225—97 |

JAMES M. MEISTER, Primary Examiner

U.S. Cl. X.R.

83—90, 96, 97, 127